Aug. 25, 1964 H. ALBSMEIER ETAL 3,146,415

ELECTROMECHANICAL FILTER

Filed Feb. 23, 1961

United States Patent Office 3,146,415
Patented Aug. 25, 1964

3,146,415
ELECTROMECHANICAL FILTER

Hans Albsmeier and Erich Freystedt, Munich, Germany, assignors to Siemens & Halske Aktiengesellschaft, Berlin, Germany, a German corporation Filed Feb. 23, 1961, Ser. No. 91,215
Claims priority, application, Germany, Feb. 26, 1960, S 67,296; Feb. 26, 1960, S 67,297
2 Claims. (Cl. 333—72)

This invention is concerned with an electromechanical filter comprising metallic resonators which are by means of piezoelectric exciting or triggering elements energized to execute longitudinal oscillations, successively disposed resonators being coupled together by means of coupling members disposed at oscillation nodes, the length of said coupling members being considerably shorter than one quarter wave length of the material thereof, and the cross sectional dimensions being such that the coupling of successive resonators, which is due to shearing forces, reaches a predetermined value.

An electromechanical filter of the above indicated kind can be used, for example, for interconnecting two successively disposed amplifier stages, whereby the filter operates to transmit only a predetermined frequency band while suppressing all other frequencies as completely as possible. In such case, the coupling must be dimensioned as accurately as possible according to predetermined conditions for the individual longitudinal resonators. In a known embodiment, the coupling members are for this purpose of a length corresponding to one quarter of the wave length of the material, and for the coupling are utilized the tractive and pressure forces occurring in the direction of the respective coupling elements incident to diminution and increase of the cross sectional area of the longitudinal resonator responsive to oscillation thereof in the rhythm of its resonance frequency. The disadvantages of such coupling are that the filter becomes geometrically quite large and therewith mechanically vulnerable, and that successively positioned resonators are strongly excited to harmonic bending oscillations.

Another known filter comprises a plurality of longitudinal resonators made of thin metal strip, such resonators being interconnected, by means of small coupling members adapted to transmit shearing forces, to form a compact unit. The longitudinal resonators of this arrangement are excited by magnetostriction. A filter which is thus constructed of metal strip harbors the danger of side resonances, and its efficiency is relatively low unless particularly great expenditures are made for the coupling and decoupling thereof.

The object of the invention is to show a way along which these difficulties can be overcome.

According to the invention, this object is realized in connection with an electromechanical filter comprising a plurality of resonators which are excited to longitudinal oscillations by piezoelectric exciting or triggering elements, wherein successive resonators are coupled by means of coupling members connected to the oscillation node, the length of such coupling members being considerably less than one quarter wave length of the material thereof, and the cross sectional dimensions of the coupling members being selected so large that the coupling of successive resonators, which is due to shearing forces, reaches a predetermined value, by making the individual piezoelectric exciting or triggering element in the form of a thin plate of electrostrictive material, such plate being fastened to the corresponding resonator at the end thereof which lies in the oscillation direction and being provided with a thin conductive coating serving with respect to the metallic resonator as a further electrode.

It is in this connection of particular importance that the cross section of the individual longitudinal resonator is approximately square or at least approaches square configuration. An extraordinarily effective coupling is obtained by positioning the small plate of piezoelectric material flush with the margin of such a resonator, in a manner to be presently shown with reference to embodiments of the invention, which is due to the fact that the piezoelectric material acts with respect to the individual resonator in a manner similar to a reaction force drive.

It is broadly known, in connection with an electromechanical filter, to substitute a part of the individual resonator by electrostrictive material. However, in prior structures, the resonator is, for example, cut in its central region and the piezoelectric material is inserted therein, or the resonator is provided with a strip of electrostrictive material extending longitudinally thereof. The first noted structure operates similar to a system which delivers only tractive forces and pressure forces, while the second noted structure provides in a sense for a contraction and expansion of a longitudinal fiber of the resonator in rhythm with the alternating voltage applied thereto. As contrasted therewith, it is for the present invention important that the exciting or triggering energy is delivered by the reactive force of the small plates provided at the ends of the respective resonators. It is exactly this feature which provides for good efficiency with least influence of the properties of the entire resonator which have to do with the frequency response thereof.

Moreover, it has been found advantageous to provide on both ends of the resonator lying in the direction of oscillation, thin plates of electrostrictive material together with their thin conductive coatings.

It is also of advantage to provide for mounting the filter by means of wires which are fastened at least on the outermost resonators in the range of the oscillation node plane lying perpendicularly to the resonator axes.

The various objects, features and details of the invention will now be explained with reference to the accompanying drawing showing embodiments thereof.

Figure 1:
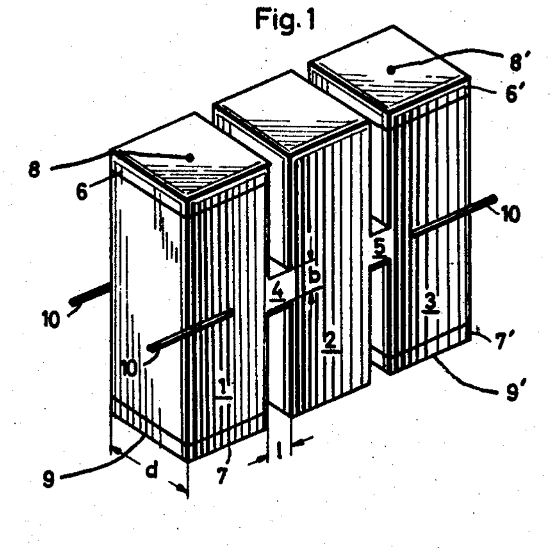
FIG. 1 shows a three element electromechanical filter.

The three element filter shown in FIG. 1 comprises three longitudinal resonators 1, 2 and 3 which are coupled together by means of coupling bridges or parts 4 and 5. The terminal resonators 1 and 3 are at the ends thereof provided with small plates of electrostrictive material, indicated at 6, 6', and 7, 7', especially, electrostrictive ceramic material, fastened thereon, for example, by means of a known metal-ceramic-solder compound or by suitable cementing. The free surfaces of the respective end plates 6, 6' and 7, 7' are metallized, preferably with a gold coating vaporized thereon, to which are connected terminal wires 8, 8' and 9, 9' in good conductive engagement therewith. These terminal wires are very flexible. The mounting of the oscillation system is effected by means of wires 10 which are fastened on the terminal resonators 1 and 3 in the zero plane thereof, for example, by spot welding or by soldering. The zero plane is understood to mean the plane which remains at rest incident to the longitudinal oscillation of the resonator. This plane is frequently referred to as the neutral zone. In the described example, the coupling bridges 4 and 5 lie symmetrical to this neutral zone and the length $l$ thereof is small as compared with one quarter of the wave length of the material. The coupling is effected in connection with these coupling members by suitable dimensioning of the width $b$ and, in the illustrated example, by the thickness $d$ of the resonators. However, the dimension $d$ may be smaller than the thickness of the resonator.

The above indicated construction assures that the coupling is largely effected by pure shearing forces between the individual resonators. The shearing component can accordingly be selected as desired by varying the size of the dimension *b*, thus also making the band width of the filter selectable as desired, so far as it can be influenced by the coupling.

Figure 2:
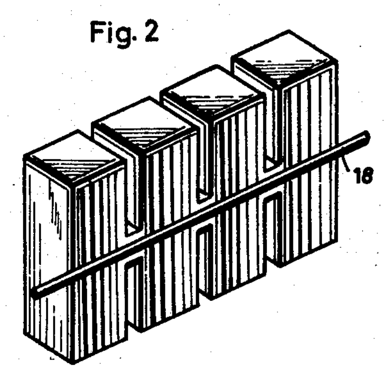
FIG. 2 represents the arrangement of carrier wires in connection with a four element filter.

Instead of using carrier wires such as 10 shown in FIG. 1, there may be used a single wire as shown in FIG. 2 at 18, in connection with a four element filter, wherein such wire extends uninterrupted on one side of the filter.

Figure 3:
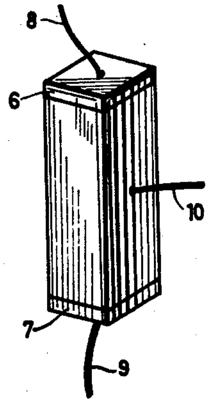
FIG. 3 illustrates a terminal resonator as an entity.

An end or terminal resonator constructed in accordance with the invention in separately shown in FIG. 3. The two terminals 8 and 9 extend to the conductive coatings while the terminal 10 is conductively connected with the remaining part of the resonator which is preferably made of steel. An equivalent circuit diagram for the structure is represented in FIG. 4.

Figure 4:
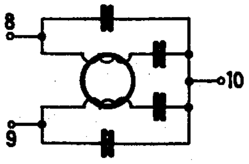
FIG. 4 shows an equivalent circuit diagram.

Referring to FIG. 4 in light of FIG. 3, it will be seen that circuits each with a series resonance circuit and a parallel capacitance extend in parallel respectively between terminals 8, 10 and 9, 10 thus coupling the inductivities of the series resonance circuits. Considered physically, the excitation or triggering of the terminal resonator or oscillator, which is supplemented to a coupling member, is effected by the alteration in thickness of the electrostrictive material, in the direction of the longitudinal axis of the resonator. It must be considered in this connection that the association of the inactive resonator material with the electromechanically active material results in a reduction in the mechanical coupling factor. However, since the coupling factors are very high, especially in the case of electrostrictive ceramic material, and since only relatively low coupling values are required for filter purposes, depening upon the band width, the ceramic part can be kept small, thus making it possible to obtain a good temperature coefficient with respect to the frequency. This is particularly true when the mechanically inactive part is made of steel because, owing to the favorable temperature coefficient of steel and the relatively small size of the ceramic part, dependence of the resonator frequency on the temperature will be very slight. Insofar as the principle is concerned, at least a nearly complete temperature compensation is possible within a given range, by using an electrostrictive material with a temperature coefficient which is opposite to that of the resonator material, and by suitably dimensioning the cross sectional areas and relative proportions of these two materials a substantial cancellation of the respective temperature effects may be achieved thus eliminating frequency variations in response to temperature changes.

Changes may be made within the scope and spirit of the appended claims which define what is believed to be new and desired to have protected by Letters Patent.

We claim:

1. An electromechanical filter comprising elongated metallic resonators which are by means of piezoelectric excitation elements energized to execute longitudinal oscillations, said resonators being disposed to oscillate in a common direction, successively disposed resonators being coupled by means of coupling members extending in the oscillation node intermediate the ends of the respective resonators, the length of said coupling members being considerably shorter than one quarter wave length of the material thereof and the cross sectional dimensions of said coupling members being such as to obtain a predetermined value with respect to the coupling of successive resonators which coupling is effected by shearing forces, each individual piezoelectric excitation element comprising a relatively thin plate of electrostrictive material, each plate being fastened to and supported by an end of a respective resonator which lies in oscillation direction and being provided with a relatively thin conductive coating forming with respect to the metallic resonator a further electrode, and wire means attached at least to the outer resonators within the region of the oscillation node plane which extends perpendicular to the resonator axis, said wire means serving as holding means for the filter.

2. An electromechanical filter comprising elongated metallic resonators which are by means of piezoelectric elements energized to execute longitudinal oscillation, said resonators being disposed to oscillate in a common direction, successively disposed resonators being coupled by means of coupling members in the oscillation node intermediate the ends of the respective resonators, the length of said coupling members being considerably shorter than one quarter wave length of the material thereof and the cross sectional dimensions of said coupling members being such as to obtain a predetermined value with respect to the coupling of successive resonators which coupling is effected by shearing forces, each individual piezoelectric excitation element comprising a relatively thin plate of electrostrictive material, each plate being fastened to and supported by an end of a respective resonator which lies in oscillation direction and being provided with a relatively thin conductive coating forming with respect to the metallic resonator a further electrode, further similar plates of electrostrictive material respectively provided with a similar conductive coating and fastened to the opposite ends of the respective resonator, and wire means attached at least to the outer resonators within the region of the oscillation node plane which extends perpendicular to the resonator axis, said wire means serving as holding means for the filter.

References Cited in the file of this patent

UNITED STATES PATENTS

| | | |
|---|---|---|
| 2,345,491 | Mason | Mar. 28, 1944 |
| 2,695,357 | Donley | Nov. 23, 1954 |
| 2,814,785 | Burns | Nov. 26, 1957 |
| 2,955,267 | Mason | Oct. 4, 1960 |
| 3,015,789 | Honda | Jan. 2, 1962 |
| 3,064,213 | Mason | Nov. 13, 1962 |
| 3,086,183 | Schofer | Apr. 16, 1963 |

OTHER REFERENCES

Adams: "New Magnetostriction Filters for the M.F. Band." 1957, IRE National Convention Record, Part 9, Nuclear Science-Utrasonics Eng., pages 43–45.